US005588121A

United States Patent [19]

Reddin et al.

[11] Patent Number: 5,588,121

[45] Date of Patent: Dec. 24, 1996

[54] PARALLEL COMPUTER HAVING MAC-RELAY LAYER SNOOPED TRANSPORT HEADER TO DETERMINE IF A MESSAGE SHOULD BE ROUTED DIRECTLY TO TRANSPORT LAYER DEPENDING ON ITS DESTINATION

[75] Inventors: Timothy G. Reddin, Stockport; David S. Walsh, Rossendale; Jeremy S. Round, Warrington, all of Great Britain

[73] Assignee: International Computers Limited, London, England

[21] Appl. No.: 647,192

[22] Filed: May 9, 1996

Related U.S. Application Data

[63] Continuation of Ser. No. 176,784, Jan. 3, 1994, abandoned.

[30] Foreign Application Priority Data

Jan. 19, 1993 [GB] United Kingdom .................. 9300942

[51] Int. Cl.[6] .......................... G06F 13/00; G06F 13/14

[52] U.S. Cl. .............................. 395/200.15; 395/200.02; 395/200.12; 395/800; 379/292; 370/389; 370/469

[58] Field of Search ................................ 370/85.13, 60; 340/825.79; 395/800, 200.17, 200.15, 200.02, 200.12; 379/292

[56] References Cited

U.S. PATENT DOCUMENTS 4,752,777 6/1988 Franaszek .......................... 340/825.79
4,954,945 9/1990 Inoue ...................................... 364/200
5,088,090 2/1992 Yacoby ................................ 370/85.13
5,323,388 6/1994 Chang et al. ............................ 370/60
5,379,440 1/1995 Kelly et al. ............................ 395/800
5,426,637 6/1995 Derby et al. ........................ 370/85.13
5,430,842 7/1995 Thompson et al. ................ 395/200.17

FOREIGN PATENT DOCUMENTS 0204959 12/1986 European Pat. Off. .
0353859 2/1990 European Pat. Off. .

OTHER PUBLICATIONS

Ahmed Tantawy and Martina Zitterbart, "A Scheme for Remote LAN Bridging across SMDS MANs", Feb. 1992, pp. 1642–1646.
Ahmed Tantawy and Martina Zitterbart, "Internetworking Across Public ATM Networks", Jul. 1992, pp. 150–157.

*Primary Examiner*—Thomas C. Lee
*Assistant Examiner*—Le Hien Luu
*Attorney, Agent, or Firm*—Lee, Mann, Smith, McWilliams, Sweeney & Ohlson

[57] ABSTRACT

A parallel computer system comprises a number of processing elements, at least one communication element, an internal network interconnecting the communications and processing elements, at least one external network connected to the communications element, and a number of services resident in the elements. Each of the elements includes a protocol stack comprising transport, network, logical link and MAC (media access control) layers. Routing messages between services and the external network is performed in the MAC layer, rather than by a relay service at application level as in conventional systems. This improves the efficiency of the system, by obviating the need to pass messages up the stack to the routing function and then to pass them back down the stack again.

4 Claims, 5 Drawing Sheets

SERVICE LOCATION TABLE

| SERVICE | NODE LIST |
|---|---|
| ISO TSAP 0x4925 | 1,2,3,4,5,6,7 |
| ISO TSAP 0x4927 | 1,3,5,7,9,11 |
| TCP PORT 2345 | 1,5,9,15,22,30 |
| TCP PORT 2346 | 22,33,44 |
| ... | ... |

COUPLER LOCATION TABLE

| VIRTUAL MAC ID | CE | COUPLER | STATUS | EQUIVALENCE CLASS |
|---|---|---|---|---|
| 0 | 0 | 0 | OPERATIONAL | a |
| 1 | 1 | 0 | OPERATIONAL | a |
| 2 | 0 | 1 | OPERATIONAL | b |
| 3 | 1 | 1 | FAILED | b |

STRUCTURED OSI TRANSPORT REFERENCE

PARALLEL COMPUTER HAVING MAC-RELAY LAYER SNOOPED TRANSPORT HEADER TO DETERMINE IF A MESSAGE SHOULD BE ROUTED DIRECTLY TO TRANSPORT LAYER DEPENDING ON ITS DESTINATION

This application is a continuation of application Ser. No. 176,784, filed Jan. 3, 1994, now abandoned.

BACKGROUND OF THE INVENTION

This invention relates to parallel computer systems. A parallel computer system comprises a number of processing nodes interconnected by an internal network which enables the nodes to send messages to each other.

In such a system, interconnection between application programs running in different nodes is conventionally handled by means of a multi-layer protocol stack, for example based on the well known Reference Model for Open Systems Interconnection (OSI). Such a protocol stack typically includes transport, network, logical link and media access control (MAC) layers.

It has been proposed that one or more of the nodes should act as communications elements (CE) providing connection to the outside world by way of one or more external networks, while the other nodes act as processing elements (PE). The PEs communicate with the outside world by way of the CE.

In this case, some means must be provided for routing messages between the external network and the individual applications within the PEs. This may be achieved by means of a relay service, which runs at application level within the CE. However, a problem with this is that it imposes a large processing load on the CE since all incoming messages must be passed up the protocol stack within the CE to relay function, and then passed back down the stack to be transmitted over the internal network to the PE in which the target application is located. This problem becomes more severe as the number of PEs is increased, and as a result the CE can become a bottleneck, slowing down the operation of the whole system.

The object of the present invention is to overcome this problem.

SUMMARY OF THE INVENTION

According to the invention there is provided a parallel computer system comprising (a) a plurality of processing elements, (b) at least one communications element, (c) an internal network interconnecting the communications and processing elements, (d) at least one external network connected to the communications element, and (e) a plurality of services resident in the elements, (f) wherein each of the elements includes a protocol stack comprising transport, network, logical link and MAC layers, (g) and wherein the MAC layer in each element includes means for routing messages between services in that element and the external network.

It can be seen that, because the routing function is performed at the level of the MAC layer, it is not necessary for message to be passed up the stack to a relay function, and passed down again. Hence, the amount of processing within the CE is substantially reduced.

DESCRIPTION OF AN EMBODIMENT OF THE INVENTION

One parallel computer system in accordance with the invention will now be described by way of example with reference to the accompanying drawings.

OVERALL DESCRIPTION OF THE SYSTEM

Figure 1:
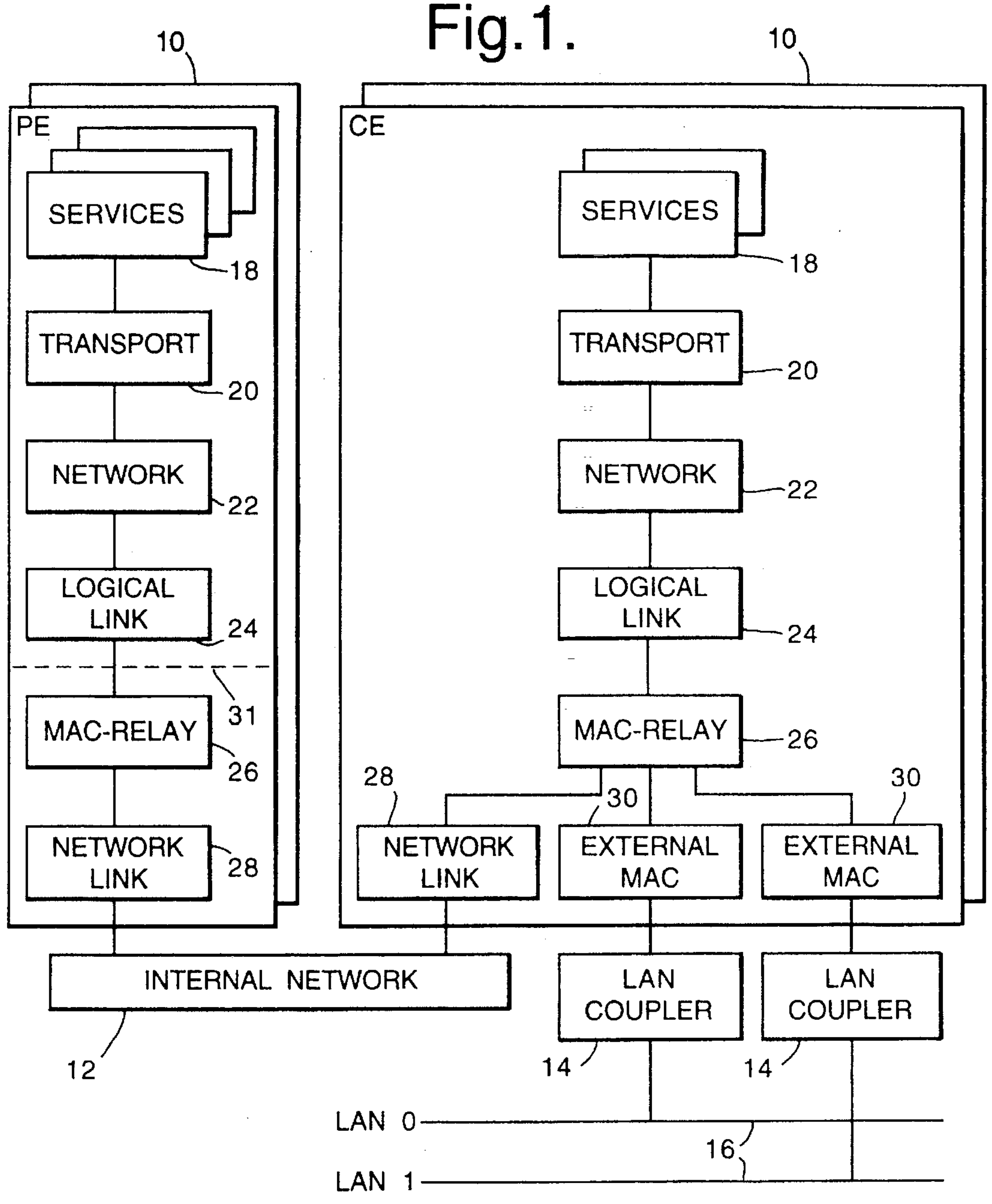
FIG. 1 is a block diagram of a parallel computer system in accordance with the invention.

Referring to FIG. 1, the system comprises a number of processing nodes 10, including a plurality of processing elements PE and a plurality of communications elements CE. The PEs and the CEs are interconnected by means of an internal network 12 which may, for example, be a delta-switch network, which allows any one of the nodes to pass a message to any other node.

Each communications element CE is connected by means of one or more couplers 14 to a number of external local area networks (LANs) 16. These LANs may, for example, be standard FDDI (fibre distributed data interface) networks.

All communications between the system and the outside world take place by way of one of the CEs, over one of the external LANs. Thus, if one of the PEs requires to communicate with the outside world it must do so by way of a CE.

Each node (PE or CE) includes one or more services 18, i.e. applications programs which provide a particular service for a user, such as for example a database service. A given service may have multiple instances, these instances being distributed across a number of nodes.

Each node (PE or CE) also includes a protocol stack, comprising a transport layer 20, a network layer 22 and a logical link layer 24. These layers 20–24 may all be conventional. Instead of a conventional MAC layer, however, each node includes a special layer referred to herein as the MAC-relay layer 26, which will be described in detail below.

The MAC-relay layer in each node is connected to the internal network 12 by way of a network link 28. Each node's MAC-relay layer can communicate with every other nodes MAC-relay layer via this internal network. The MAC-relay in each CE also communicates with the external LAN couplers 14 by way of respective external MAC layers 30. These external MAC layers may be conventional. The MAC-relay in each PE presents a virtual MAC interface 31 for every external MAC that is available in the CEs.

As will be described, the MAC-relays provide a mechanism for routing messages between the nodes, avoiding the need for any relay function at application level.

Message Format

Figure 2:
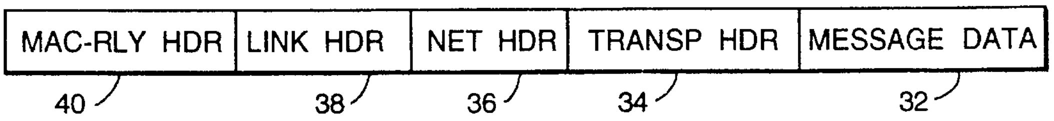
FIG. 2 is a schematic diagram of a message transmitted within the system.

FIG. 2 shows the format of a message passed over the internal network 12.

The message comprises message data 32 which is generated at application level, a transport header 34 added by the transport layer, a network header 36 added by the network layer, a logical link header 38 added by the logical link layer, and a MAC-relay header 40 added by the MAC-relay layer.

The MAC-relay header includes a destination element address, indicating which of the nodes (PE or CE) the message is to be routed to by the internal network. It also contains an identifier which indicates the type of message. Possible message types include: internal, external and management message types.

MAC-Relay

Figure 3:
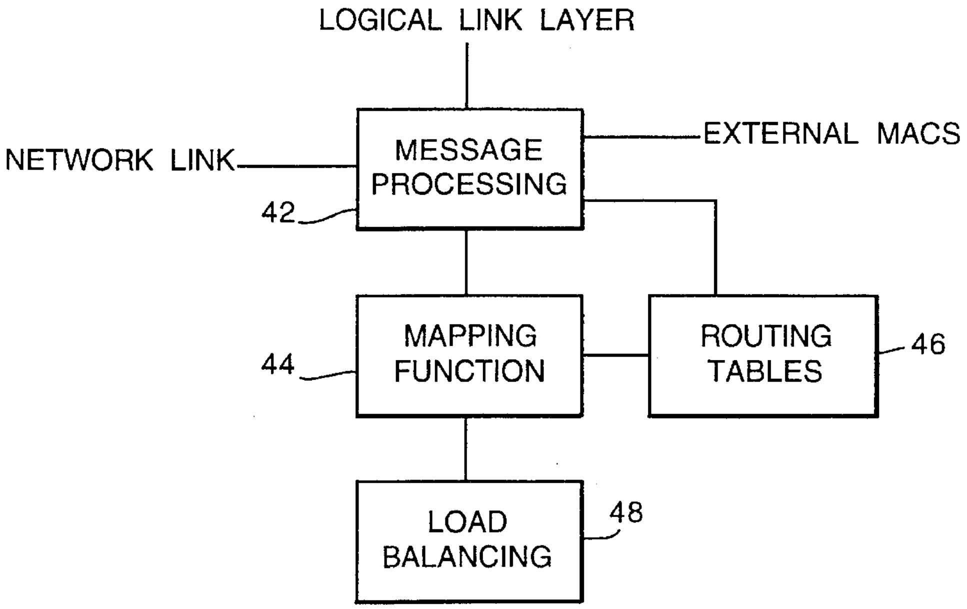
FIG. 3 is a block diagram showing a MAC-relay component in more detail.

Referring now to FIG. 3, this shows the MAC-relay layer 26 in one of the CEs in more detail. The MAC-relays in the PEs are similar, but have fewer functions since they do not communicate with the external MACs 30.

The MAC-relay includes a message processing module 42 which receives messages from and passes messages to the internal network, external MAC and the logical link layer of the local protocol stack. The MAC-relay also includes a mapping function 44, which is used for routing messages. The mapping function 44 uses a set of routing tables 46, and a load balancing function 48, the purpose of which will be explained.

Message Processing

Figure 4:
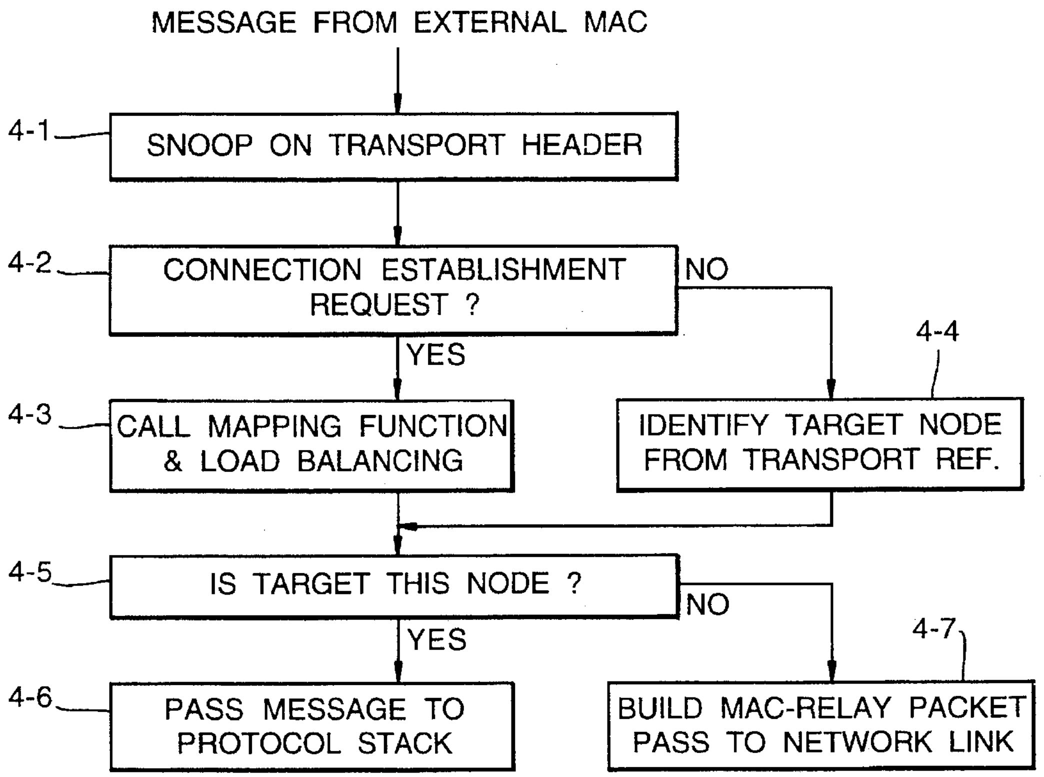
FIGS. 4–6 are flow charts showing the operation of the MAC-relay component.

FIG. 4 shows the operation of the MAC-relay in a CE when it receives a message from the external MAC component.

(4-1) The MAC-relay snoops at the message type within the transport header 34 (FIG. 2) of the message, and extracts either the destination transport address or the transport reference as described below.

(4-2) The MAC-relay then checks whether this is a connection establishment request (i.e. a request from a user to be connected to a particular service).

Figures 9, 10, 11:
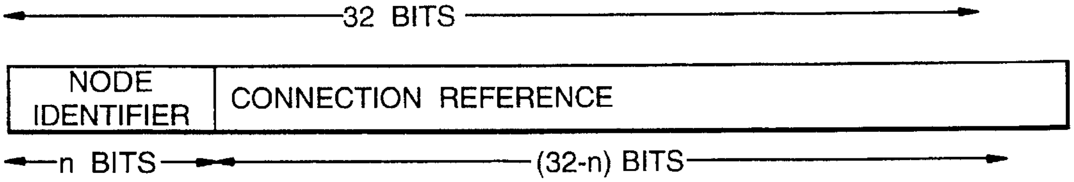
FIGS. 9–10 show respective service location and coupler location tables.
FIG. 11 shows the form of a structured transport reference.

(4-3) If so, the service mapping function is called, to determine which of the nodes the required service resides in. If there are several instances of the service, resident in different nodes, the load balancing function is called to select one of these instances. This selection may be based, for example, on a simple round-robin algorithm, or may use a more sophisticated algorithm for ensuring even load-balancing and resource sharing between the nodes. The mapping function returns the identity of the selected element. The service mapping function uses a service location table (FIG. 9).

(4-4) In the case of OSI transport messages that are not connection establishment requests, the transport reference is used to determine which node the message is routed to. It is arranged that, whenever a connection is established between a user and a service instance, the service allocates a structured transport reference (FIG. 11) to that connection. Part of this reference indicates which node the service is resident in. Thus, the MAC-relay can use this transport reference to determine directly the destination of the message, without having to consult any tables. In the case of TCP/IP transport messages, local tables are maintained, in the CEs, by MAC-relay to steer incoming messages.

(4-5) The MAC-relay then checks whether the destination node is the local node, or some other node.

(4-6) If the destination node is the local node, the message is passed to the local protocol stack, and it will then be passed up this stack to the required service.

(4-7) If, on the other hand, the message is intended for another node, the MAC-relay builds a MAC-relay message by adding a MAC-relay header (see FIG. 2) and passes it to the network link 28, for transmission over the internal network 12.

Figure 5:
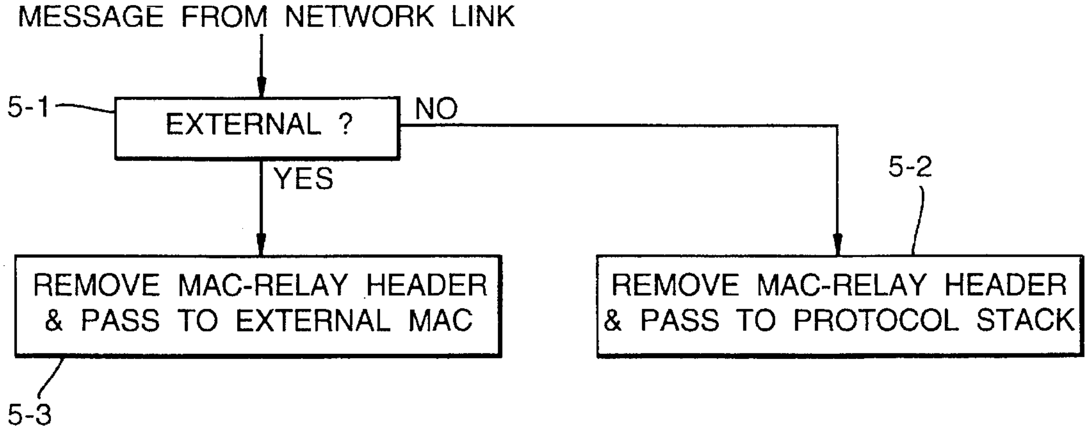

FIG. 5 shows the operation of the MAC-relay in a CE when it receives non-management message from the internal network.

(5-1) The MAC-relay checks to see if the message is an internal message or if it is destined for the external LAN.

(5-2) If it is an internal message, the MAC-relay header is removed, and the message is passed to the local protocol stack. It is then passed up this stack to the target service.

(5-3) If it is an external message, the MAC-relay header is removed, and the message is passed to the designated external MAC 30 for transmission on the LAN.

Figure 6:
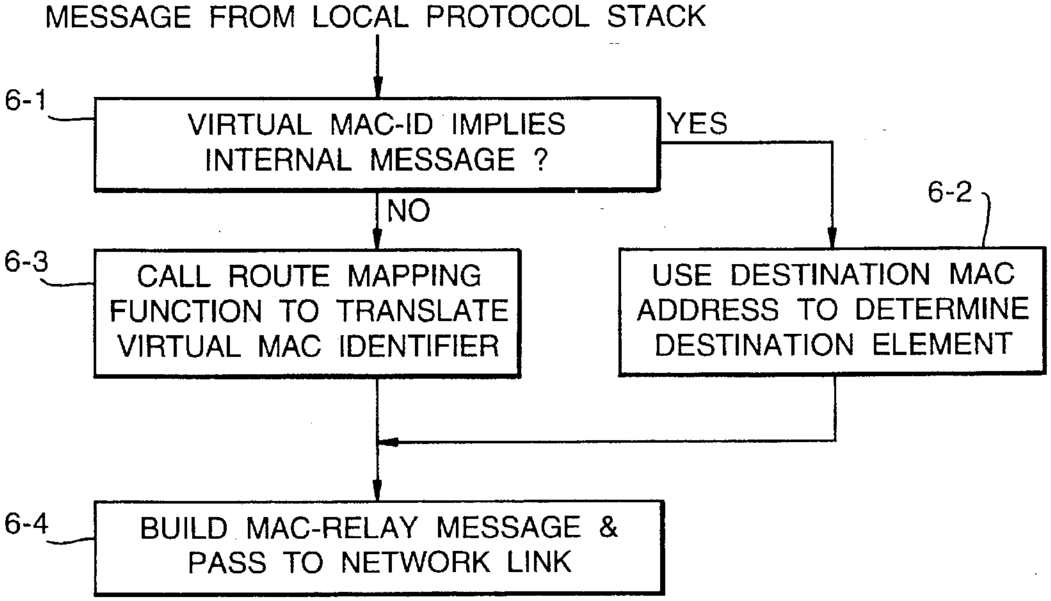

FIG. 6 shows the operation of the MAC-relay in a PE or CE when it receives a message from the local protocol stack.

(6-1) The MAC-relay uses the virtual MAC identifier over which the message is sent to deduce whether the message is to be sent on the internal network, or on one of the external LANs.

(6-2) If the destination is internal the destination MAC address is used to determine the destination element number.

(6-3) If the destination is external, the route mapping function is called to translate the virtual MAC identifier into an element number (identifying one of the CEs) and a coupler number (identifying a particular LAN coupler attached to that CE).

(6-4) A MAC-relay message is then built, by adding a MAC-relay header. The message is then passed to the network link 28 for transmission over the internal network 12.

Figure 7:
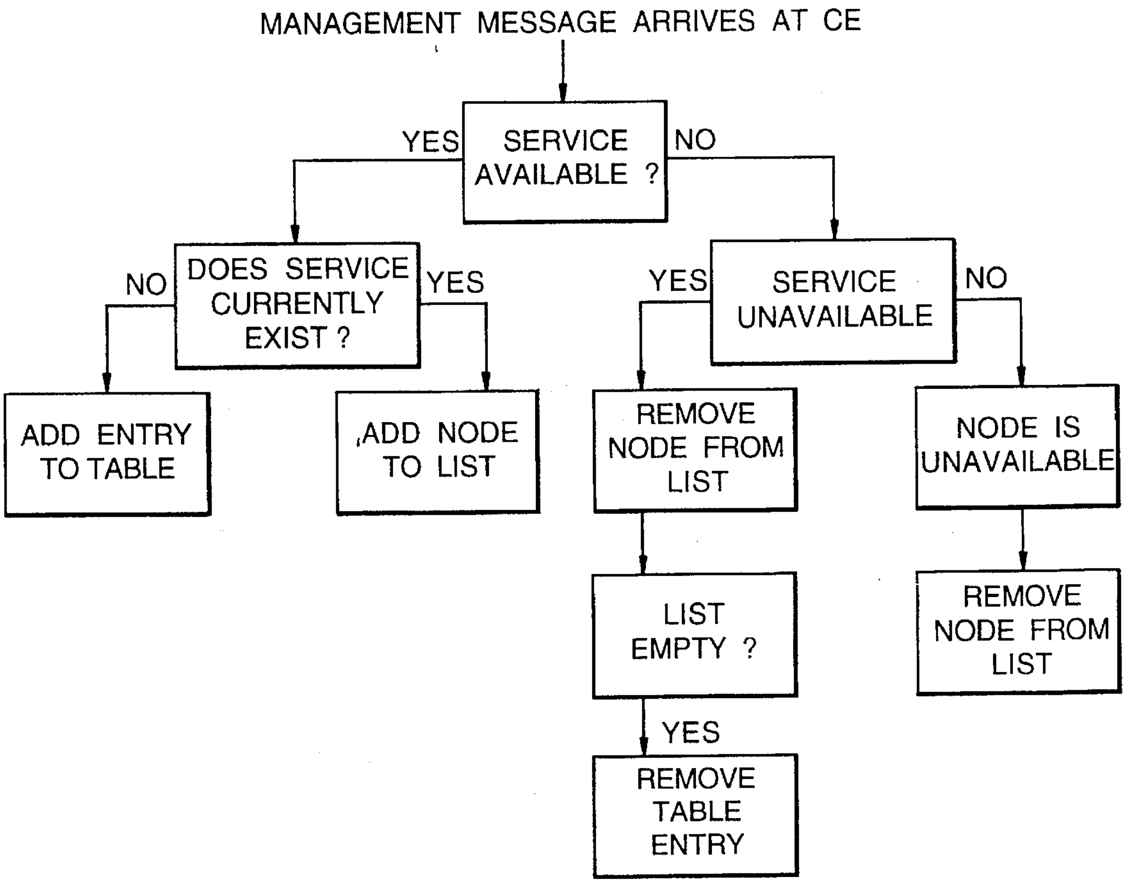
FIGS. 7–8 are further flow charts showing the operation of the MAC-relay component.

FIG. 7 shows the operation of the MAC-relay in a CE when it receives a management message, or a management notification.

The MAC-relay in each CE contains a service location table (FIG. 9) that allows it to route connection requests for particular services to the nodes which offer the nominated service. This table is used by the service mapping function described in (4-3).

If the message indicates the availability of a service upon a particular node then the node's address is added to the service's entry in the service location table.

If the message indicates that the service has ceased to be available, then the node is removed from the service's entry in the service location table.

If the MAC-relay receives a management notification which indicates that particular node is no longer available, then the specified node is removed from every entry in the service location table.

When the local MAC-relay in a PE is informed that a service has changed its status (become available) it builds a management message indicating the service identifier and the node address, which it sends to each CE.

Figure 8:
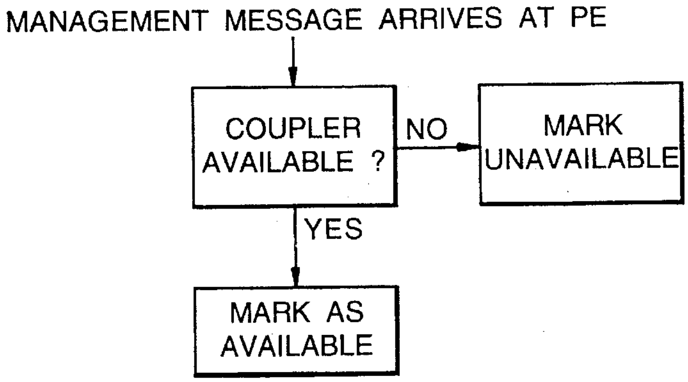

FIG. 8 shows the operation of the MAC-relay in a PE when it receives a management message.

The MAC-relay in each PE maintains a coupler location table (FIG. 10) which it uses to map virtual MAC indentifiers onto element numbers (identifying CEs) and coupler numbers (identifying a particular LAN coupler attached to the CE). The table also identifies which LAN couplers are attached to the same physical LAN, this is used to identify resilient LAN routes in case of failure. The coupler location table is used by the route mapping function described in (6-3).

If the MAC-relay receives a message indicating the availability of a particular coupler it adds it to the table and makes it available for use by the route mapping function (6-3).

If the MAC-relay receives a message indicating the failure of a particular coupler it logically removes it from the table, making it unavailable to the route mapping function (63).

We claim:

1. A parallel computer system comprising:

(a) at least one processing element including a protocol stack comprising a transport layer, a network layer, a logical link layer, a MAC-relay layer, and a network link layer;

(b) at least one communication element including a protocol stack comprising a transport layer, a network layer, a logical link layer, a MAC-relay layer, a network link layer, and an external MAC layer;

(c) an internal network interconnecting said processing element and said communication element for transmitting messages between said communication element and said processing element; each of said messages including transport header and MAC-relay header; and (d) an external network coupled to said communication element with some other communication elements, for transmitting messages destined for said communication element and for said processing element, each of said messages including a transport header, a logical link header, and a MAC header;

(e) wherein said MAC layer and said MAC-relay layer in said communication element includes:

(i) means for receiving a message from said external network by said MAC layer;

(ii) means for snooping on the transport header of said message by said MAC-relay layer to find whether the message is destined for service by the transport layer in the communication element or for service by the transport layer in the processing element;

(iii) means operative in the event that the message is destined for service by the transport layer in the communication element, for routing the message through the logical link layer and the network layer in the communication element to the transport layer in the communication element; and (iv) means operative in the event that the message is destined for service by the transport layer in the processing element, for routing the message to the transport layer of the processing element over said internal network directly without going through the logical link layer and the network layer in the communication element in accordance with said transport header and a newly built MAC-relay header added to said message by said MAC-relay layer.

2. A parallel computer system according to claim 1 wherein said external network comprises a local area network.

3. A parallel computer system according to claim 1 wherein said internal network comprises a delta-switch network.

4. A method of routing messages in a parallel computer system comprising:

(a) at least one processing element including a protocol stack comprising a transport layer, a network layer, a logical link layer, a MAC-relay layer, and a network link layer;

(b) at least one communication element including a protocol stack comprising a transport layer, a network layer, a logical link layer, a MAC-relay layer, a network link layer, and an external MAC layer;

(c) an internal network interconnecting said processing element and said communication element for transmitting messages between said communication element and said processing element; each of said messages including transport header and MAC-relay header; and (d) an external network coupled to said communication element with some other communication elements, for transmitting messages destined for said communication element and for said processing element, each of said messages including a transport header, a logical link header, and a MAC header;

(e) wherein said method comprises the steps:

(i) operating said MAC layer in said communication element to receive a message from said external network;

(ii) operating said MAC-relay layer in said communication element to snoop on the transport header of said message to find whether the message is destined for service by the transport layer in the communication element or for service by the transport layer in the processing element;

(iii) in the event that the message is destined for service by the transport layer in the communication element, operating said MAC-relay layer in said communication to route the message through the logical link layer and the network layer in the communication element to the transport layer in the communication element; and (iv) in the event that the message is destined for service by the transport layer in the processing element, operating said MAC-relay layer in said communication element to route the message to the transport layer of the processing element over said internal network directly without going through the logical link layer and the network layer in the communication element in accordance with said transport header and a newly built MAC-relay header added to said message by said MAC-relay layer.

* * * * *